United States Patent [19]
Yokote et al.

[11] Patent Number: 5,193,845
[45] Date of Patent: Mar. 16, 1993

[54] VEHICLE VIBRATION DAMPING FORCE CONTROL SYSTEM

[75] Inventors: Masatsugu Yokote; Fukashi Sugasawa, both of Yokohama; Tomohiro Yamamura, Yokosuka, all of Japan

[73] Assignee: Nissan Motor Co., Ltd., Yokohama, Japan

[21] Appl. No.: 735,336

[22] Filed: Jul. 24, 1991

[30] Foreign Application Priority Data

Jul. 31, 1990 [JP] Japan .................. 2-202834

[51] Int. Cl.$^5$ .......................... B60G 17/015
[52] U.S. Cl. ..................... 280/707; 280/714
[58] Field of Search .......... 280/707, 714, 709

[56] References Cited

U.S. PATENT DOCUMENTS 5,071,158 12/1991 Yonekawa et al. ............... 280/707

FOREIGN PATENT DOCUMENTS 60-64011 4/1985 Japan .
60-128011 7/1985 Japan .
0068413 3/1988 Japan ..................... 280/707
0279416 11/1990 Japan ..................... 280/707

Primary Examiner—Tamara L. Graysay
Attorney, Agent, or Firm—Foley & Lardner

[57] ABSTRACT

In a vehicle vibration damping force control system, rolling, pitching and bouncing motions are detected independently in a predetermined priority order; each detected motion is compared with respective predetermined levels; if each detected motion exceeds each predetermined level, hydraulic switch valves are controlled so that operating fluid energized by stroke changes of the hydraulic cylinders due to the detected vibration motion is passed through damping force generating mechanisms to increase a damping force against only the detected vibration motion, without generating any other damping forces against other non-detected vibration motions. Since only the necessary damping force is generated against only the detected vibration motion, the damping force is minimized to maintain vehicle riding comfort.

8 Claims, 7 Drawing Sheets

|  | MODE 1 | MODE 2 | MODE 3 | MODE 4 |
|---|---|---|---|---|
| ROLL | × | ○ | × | × |
| PITCH | × | × | ○ | × |
| BOUNCE | × | × | × | ○ |

( ○ : DAMP , × : NO DAMP )

FIG.7

VEHICLE VIBRATION DAMPING FORCE CONTROL SYSTEM

BACKGROUND OF THE INVENTION

1. Field of the Invention

The present invention relates to a vehicle vibration damping force control system, and more specifically to a system for controlling a damping force against vehicle vibration such as rolling motion, pitching motion, and bouncing motion.

2. Description of the Prior Art

A prior-art apparatus for damping vehicle rolling motion has been proposed by the same applicant and disclosed in Japanese Published Unexamined (Kokai) Patent App. No. 60-128011. That prior art apparatus comprises damping force adjustable shock absorbers serving as rolling rigidity adjustable mechanisms provided for each vehicle wheel, respectively; a steering angle sensor for detecting steering wheel angles; steering rate calculating means for calculating a steering rate per unit time on the basis of signals of the steering angle sensor; steering rate discriminating means for checking whether a value calculated by the calculating means exceeds a predetermined value; and control means for increasing each rolling rigidity of the shock absorber for each vehicle wheel only when the result discriminated by the discriminating means exceeds a predetermined steering rate.

Further, a prior-art apparatus for damping vehicle pitch motion has been proposed by the same applicant and disclosed in Japanese Published Unexamined (Kokai) Patent App. No. 60-64011. The apparatus for damping vehicle pitch motion comprises means for detecting vehicle brake state; means for checking brake start time and brake end time on the basis of the detected brake state; and control means for momentarily increasing the damping force or the spring constant for at least front wheels or rear wheels at the respective brake start and end times.

In the prior-art vehicle motion damping apparatus, although the damping force for each vehicle wheel can be adjusted according to vehicle behavior such as rolling or pitching motion, since the damping force against various behavior (that is rolling, pitching, bouncing, etc.) is adjusted simultaneously in proportion to the wheel base and/or the vehicle tire tread, there exists a problem in that riding comfort is degraded. For example, when a higher damping force is generated to damp the rolling motion, the damping force against the bouncing motion is simultaneously increased.

SUMMARY OF THE INVENTION

With these problems in mind, therefore, it is the primary object of the present invention to provide a vehicle vibration damping force control system which can provide a higher vehicle vibration damping effect, independently without exerting the influence of a damping force against a specific vehicle behavior (that is, one of rolling, pitching and bouncing motion) upon the other damping forces against the other vehicle behaviors, in order to improve riding comfort.

To achieve the above-mentioned object, the present invention provides a vehicle vibration damping force control system, comprising: (a) a plurality of double-acting cylinders each formed with two chambers and provided between a vehicle body and a vehicle wheel, respectively; (b) a pipe arrangement for mutually connecting the two chambers of said plural double-acting cylinders, respectively, to feed operating fluid to said cylinders; (c) at least one damping force generating mechanism communicating with said pipe arrangement, for generating a damping force when the operating fluid is passed therethrough; (d) at least one switch valve disposed midway of said pipe arrangement, for switching operating fluid flow passage through said pipe arrangement; (e) behavior detecting means for detecting vehicle behavior and generating a behavior signal corresponding to the detected behavior; (f) behavior discriminating means for discriminating whether the detected behavior exceeds a predetermined level on the basis of the detected behavior signal; and (g) switch valve control means for controlling said switch valve so that the operating fluid energized by said plural double-acting cylinders due to the detected vehicle behavior may pass through said damping force generating mechanism, when said behavior discriminating means discriminates that the detected vehicle behavior exceeds the predetermined level. Further, it is preferable that the control system further comprises damping force adjusting means for adjusting a damping force of said damping force generating mechanism according to the detected behavior signal, when said behavior discriminating means discriminates that the detected vehicle behavior exceeds the predetermined level. Further, the behavior detecting means detects at least one or two of vehicle rolling motion, pitching motion and bouncing motion in a predetermined priority order. Further, the behavior detecting means comprises a lateral acceleration sensor for detecting vehicle rolling motion; a longitudinal acceleration sensor for detecting vehicle pitching motion; and a vertical acceleration sensor for detecting vehicle bouncing motion.

Further, the present invention provides a method of controlling vehicle vibration, comprising the steps of: (a) detecting a first vehicle vibration behavior; (b) checking whether the detected first vibration behavior exceeds a first predetermined level; (c) if the detected first vibration behavior is equal to or less than the first predetermined level, detecting a second vehicle vibration behavior without increasing any vehicle vibration damping force; (d) checking whether the detected second vibration behavior exceeds a second predetermined level; (e) if the detected second vibration behavior is equal to or less than the second predetermined level, detecting a third vehicle vibration behavior without increasing any vehicle vibration damping force; (f) checking whether the detected third vibration behavior exceeds a third predetermined level; (g) if the detected third vibration behavior is equal to or less than the second predetermined level, increasing no vehicle vibration damping force; (h) if the detected first vibration behavior is more than the first predetermined level, in step (b) above, increasing a damping force against only the detected first vibration behavior without increasing vehicle vibration damping forces against the other vibration behaviors; (i) if the detected second vibration behavior is more than the second predetermined level in step (d) above, increasing a damping force against only the detected second vibration behavior without increasing vehicle vibration damping force against the other vibration behaviors; and (j) if the detected third vibration behavior is more than the third predetermined level in step (f) above, increasing a damping force against only the detected third vibration behavior without increasing vehicle vibration damping force against the other vibration behaviors.

In the vehicle vibration damping force control system according to the present invention, each vehicle behavior (that is rolling, pitching and bouncing) is detected; each detected vehicle behavior is discriminated to determine whether it exceeds each predetermined level, independently; and if a detected vehicle behavior exceeds a predetermined level, the switch valve is so controlled that operating fluid energized by stroke change of the hydraulic cylinders due to the detected vehicle behavior is passed through the damping force generating mechanism to increase a damping force against only the detected vehicle behavior, without generating any other damping forces against the other vehicle behaviors. That is, since only the necessary damping forces are generated against only the detected vehicle behaviors, it is possible to minimize the damping force to maintain vehicle riding comfort. Further, when the damping force is adjusted according to the detected vehicle behavior, it is possible to more reliably damp the vehicle vibration.

DETAILED DESCRIPTION OF THE PREFERRED EMBODIMENTS

Embodiments of the vehicle vibration damping force control system according to the present invention will be described hereinbelow with reference to the attached drawings.

Figure 1A:
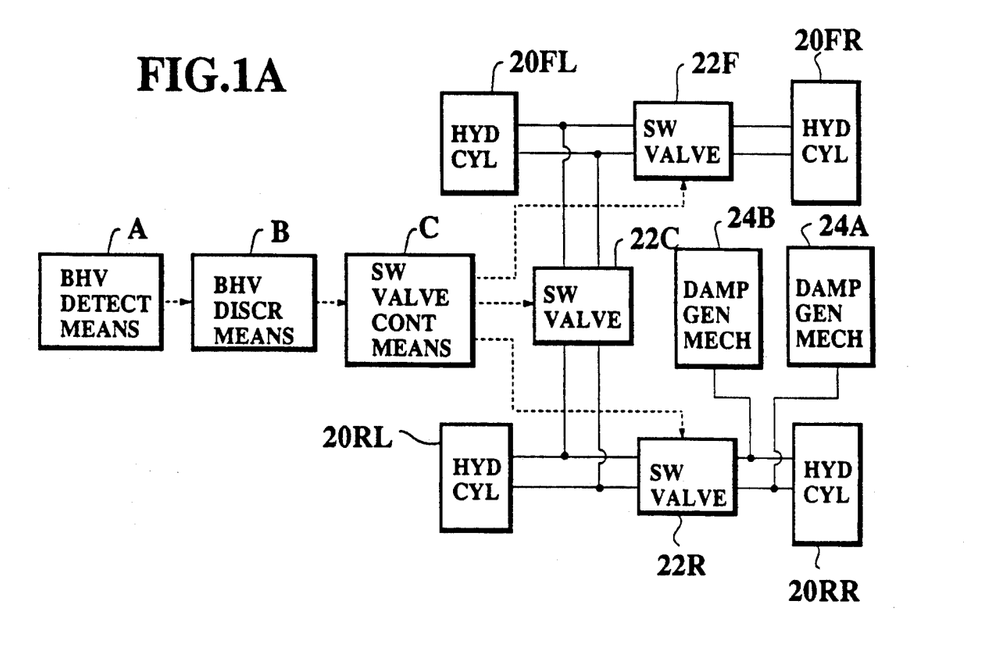
FIG. 1A is a schematic block diagram showing a first embodiment of the vehicle vibration damping force control system according to the present invention.

FIG. 1A shows a first embodiment thereof, which comprises: four double-acting hydraulic cylinders 20FR, 20FL, 20RR and 20RL disposed between a vehicle body and four vehicle wheels, respectively; a pipe arrangement composed of a pair of pipes for connecting two cylinder chambers of the four hydraulic cylinders to each other; two damping force generating mechanisms 24A and 24B communicating with the pipe arrangement to generate a damping force due to fluid resistance of the operating fluid; three switching valves 22F, 22C and 22R each disposed between a pair of the pipes to switch the hydraulic fluid flow passage; behavior detecting means A for detecting the vehicle behavior and generating signals corresponding thereto; behavior discriminating means B for discriminating whether the vehicle behavior exceeds a predetermined level on the basis of the signals detected by the behavior detecting means; and switching valve control means C for controlling the switching valves so that hydraulic fluid energized by stroke change of each hydraulic cylinder due to the detected vehicle behavior can pass through the damping force generating mechanisms 24A and 24B to generate a damping force only when the behavior discriminating means B discriminates that the detected behavior exceeds the predetermined level.

In the first modification of the first embodiment, the behavior detecting means A detects any one of rolling, pitching and bouncing motions. In the second modification of the first embodiment, the behavior detecting means A detects at least two of rolling, pitching and bouncing motions in accordance with a predetermined priority order.

Figure 1B:
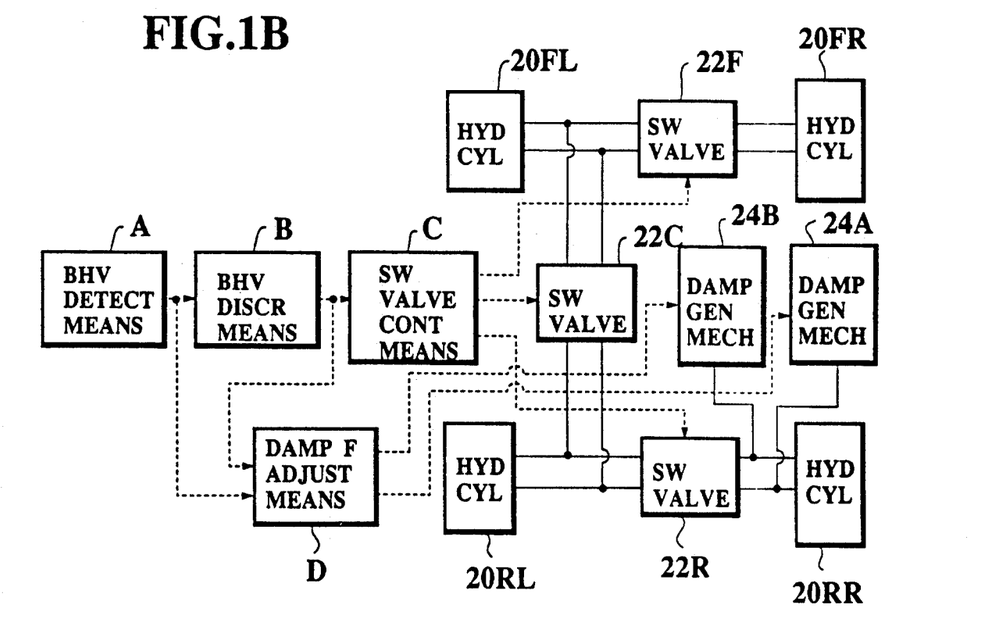
FIG. 1B is a schematic block diagram showing a second embodiment of the vehicle vibration damping force control system according to the present invention.

FIG. 1B shows a second embodiment thereof, which further comprises damping force adjusting means D for adjusting the damping forces generated by the damping force generating mechanisms according to the level of the behavior signal detected by the behavior detecting means A when the behavior discriminating means B discriminates that the detected behavior exceeds the predetermined level.

In the control system according to the present invention, the behavior detecting means A detects one or more signals corresponding to vehicle behavior (e.g., a signal corresponding to any one of rolling, pitching and bouncing motions or signals corresponding to two or three of rolling, pitching and bouncing motions) in accordance with a priority order. The behavior discriminating means B discriminates which motions of rolling, pitching and bouncing exceeds a predetermined level, respectively. The switching valve control means C controls the switching of the control valves so that only the operating fluid energized by stroke changes of the hydraulic cylinders due to rolling motion, for instance, can pass through the damping force generating mechanisms 24A and 24B when the behavior discriminating means B discriminates that the detected rolling motion exceeds the predetermined level. Therefore, the damping force generating mechanisms 24A and 24B generate damping forces against only the detected rolling motion. That is, since the damping force generating mechanism will not generate damping force against pitching and bouncing motions even if these occur, it is possible to securely suppress only the detected rolling motion, while keeping damping forces against pitching and bouncing motions at relatively low levels, thus improving the riding comfort. Further, when the behavior discriminating means B discriminates that pitching or bouncing motion exceeds the predetermined level, respectively, the damping force generating mechanisms 24A and 24B generate a damping force against only the detected pitching or bouncing motion, so that it is possible to obtain a similar effect.

In the case of the second embodiment, when the behavior discriminating means B discriminates that the detected rolling motion, for instance, exceeds the predetermined level, the damping force adjusting means D controls the damping force generating mechanism in such a way as to generate a damping force increasing with increasing signal level corresponding to the rolling motion detected by the behavior detecting means A. Therefore, the vehicle position or vibration can be more precisely controlled according to the detected rolling motion. The above control effect is the same when the behavior discriminating means A detects that pitching or bouncing motion exceeds the predetermined level, independently.

Figure 2:
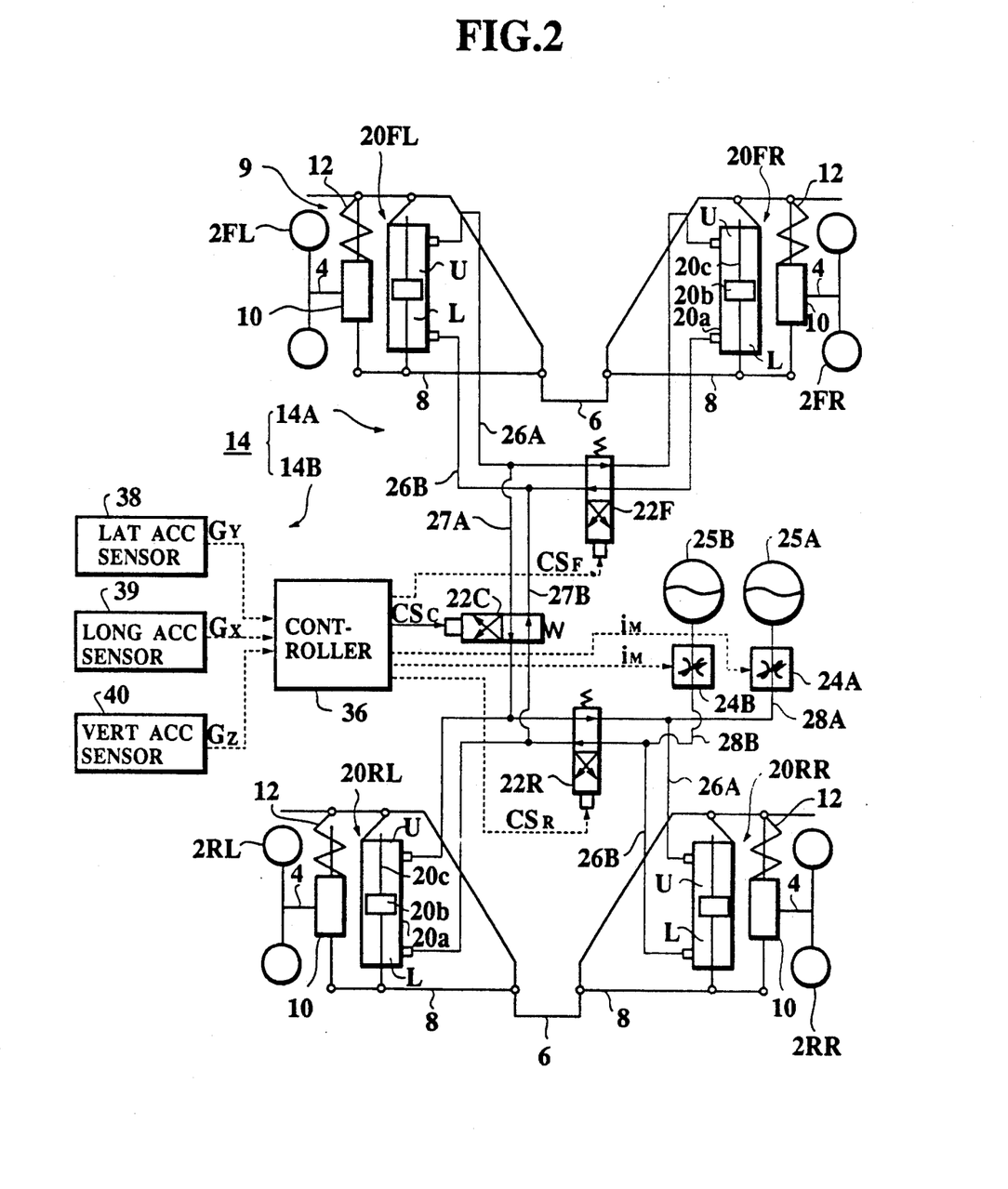
FIG. 2 is a more practical diagrammatical illustration showing the first embodiment of the present invention.

FIG. 2 is a more practical block diagram for assistance in explaining the first embodiment of the present invention. In FIG. 2, four front and rear, right and left wheels 2FR, 2FL, 2RR and 2RL are supported by a vehicle body 6 via four wheel shafts 4 and four suspension links 8, respectively. That is, one end of the suspension link 8 is pivotally supported by the wheel shaft 4 and the other end of the suspension link 8 is pivotally supported by the vehicle body 6. A suspension system 9 is provided between each wheel shaft 4 and the vehicle body 6. Each suspension mechanism is composed of a shock absorber 10 and a coil spring 12 both disposed between each suspension link 8 and the vehicle body 6. A damping force control apparatus 14 according to the present invention is provided between the vehicle body 6 and the four suspension links 8.

Each shock absorber 10 is constructed in the conventional manner and generates a damping force according to stroke speed on both the compressive and tensile sides, respectively. Further, the shock absorber 10 generates a damping force as shown by a vector v1 in FIG. 7 so that three damping force components can be generated simultaneously against rolling, pitching and bouncing motions at predetermined proportions. In the example shown in FIG. 7, the absolute value of the vector v1 is relatively small so that soft damping characteristics can be obtained to ensure riding comfort.

The damping force control unit 14 is composed of a hydraulic stabilizer 14A disposed between the vehicle body 6 and the four suspension links 8 for the four wheels 2 and a control unit 14B for controlling the damping force of the stabilizer 14A.

The stabilizer 14A includes four hydraulic cylinders 20FR, 20FL, 20RR and 20RL provided for the four wheels 2, respectively; three electromagnetic direction switching valves 22F, 22R and 22C; two damping force generating mechanisms (adjustable throttle valves) 24A and 24B; and two hydraulic fluid accumulators 25A and 25B, these elements being connected to each other via hydraulic pipes as shown in FIG. 2.

Each hydraulic cylinder 20 is a two-rod double-acting type, which comprises a cylinder tube 20a, a piston 20b slidably disposed in the cylinder tube 20a so as to separately form an upper cylinder chamber U and a lower cylinder chamber L, and a piston rod 20C fixed to the piston 20b and axially extending to both sides of the piston 20b in the cylinder tube 20a. The lower end of each piston rod 20c is connected to the suspension link 8 and the upper end of each piston rod 20c is freely supported. Furthermore, the upper end of the cylinder tube 20a (on the free end side of the piston rod 20c) is pivotally supported by the vehicle body 6. Accordingly, each hydraulic cylinder 20 is disposed in parallel to the coil spring 12 at each of the four front and rear and right and left wheels 2.

The pipe arrangement will be described in detail hereinbelow. On both the front and rear wheel sides, the upper cylinder chamber U of the left wheel side hydraulic cylinder 20FL (20RL) is connected to the upper cylinder chamber U of the right wheel side hydraulic cylinder 20FR (20RR) via a first upper hydraulic pipe 26A, and the lower cylinder chamber L of the left wheel side hydraulic cylinder 20FL (20RL) is connected to the lower cylinder chamber L of the right wheel side hydraulic cylinder 20FR (20RR) via a first lower hydraulic pipe 26B, so that the upper and lower cylinder chambers U and L of the left and right hydraulic cylinders 20FL (20RL) and 20FR (20RR) are connected in parallel to each other.

In addition, on both the front and rear wheel sides, the two first upper hydraulic pipes 26A are connected to each other via a second upper hydraulic pipe 27A, and the two first lower hydraulic pipes 26B are connected to each other via a second lower hydraulic pipe 27B. Further, the first upper hydraulic pipe 26A is connected to an upper accumulator 25A via an upper adjustable throttle valve 24A, and the first lower hydraulic pipe 26B is connected to a lower accumulator 25B via a lower adjustable throttle valve 24B.

Each adjustable throttle valve 24A or 24B includes an electromagnetic solenoid, a plunger and a spool valve, so that a diameter of the orifice is adjustable by a spool valve stroke shifted by a plunger actuated according to a current command signal $i_M$ passed through the electromagnetic solenoid.

Figure 5:
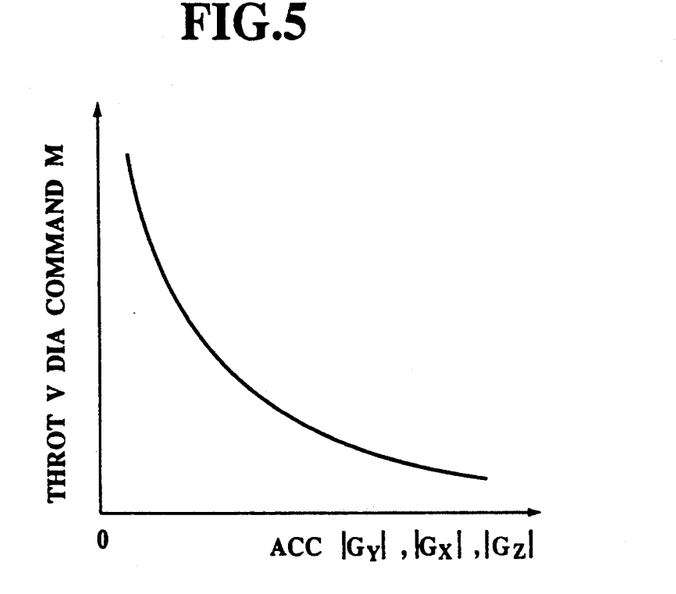
FIG. 5 is a graphical representation showing the relationship between the acceleration and the throttle diameter command M applied to the adjustable throttle valve.
Figure 6:
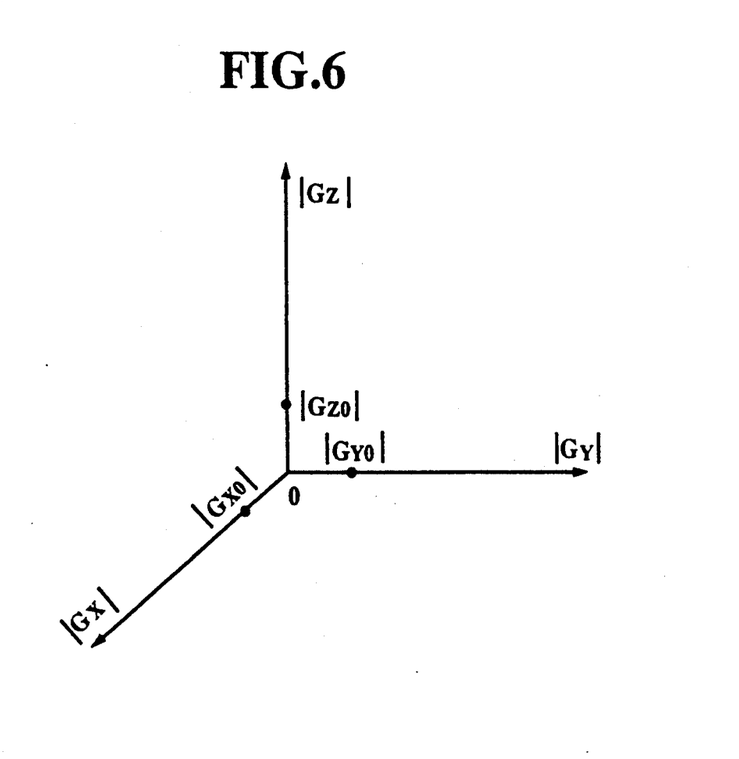
FIG. 6 is a three-dimensional graphical representation showing the relationship between the respective acceleration and the respective control thresholds.

The damping coefficient (i.e., force) is inversely proportional to the throttle diameter of the throttle valve 24A, and 24B, and increases with increasing magnitude of the detected acceleration. Therefore, the throttle diameter of the throttle valve 24A, 24B is decreased with increasing acceleration as shown in FIG. 5.

Further, a front electromagnetic direction switch valve 22F is disposed midway of the front side first upper hydraulic pipe 26A, and a rear electromagnetic direction switch valve 22R is disposed midway of the rear side first lower hydraulic pipe 26B. Further, an intermediate electromagnetic direction switch valve 22c is disposed midway of and between the second upper and lower hydraulic pipes 27A and 27B. Each switch valve 22 is a 4-port 2-position switch valve, in which a normal "parallel connection" position is obtained when a switch control signal CS supplied to the electromagnetic solenoid is at off (low) level and an offset "cross connection" position is obtained when the signal CS is at on (high) level.

Figure 3A:
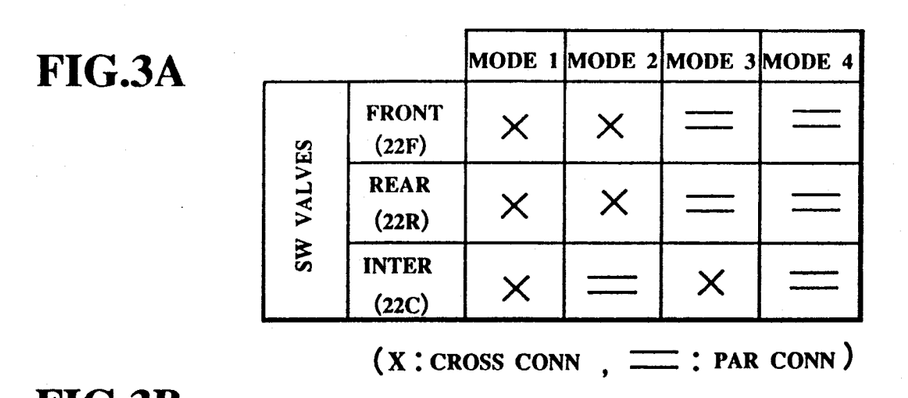
FIG. 3A is a table for assistance in explaining the relationship between the switch valve status and the control modes.

Therefore, four control modes can be obtained in combinations of two positions (cross:✕ and parallel:=) of the three switch valves 22F, 22R and 22C, as shown in FIG. 3A. That is, control mode 1 is obtained when the front, rear and central switch valves 22F, 22R and 22C are all in cross connection; control mode 2 is obtained when the front and rear switch valves 22F and 22R are in cross connection and the intermediate switch valve 22C is in parallel connection; control mode 3 is obtained when the front and rear switch valves 22F and 22R are in parallel connection and the intermediate switch valve 22C is in cross connection; and control mode 4 is obtained when the front, rear and intermediate switch valves 22F, 22R and 22C are all in parallel connection.

Figure 3B:
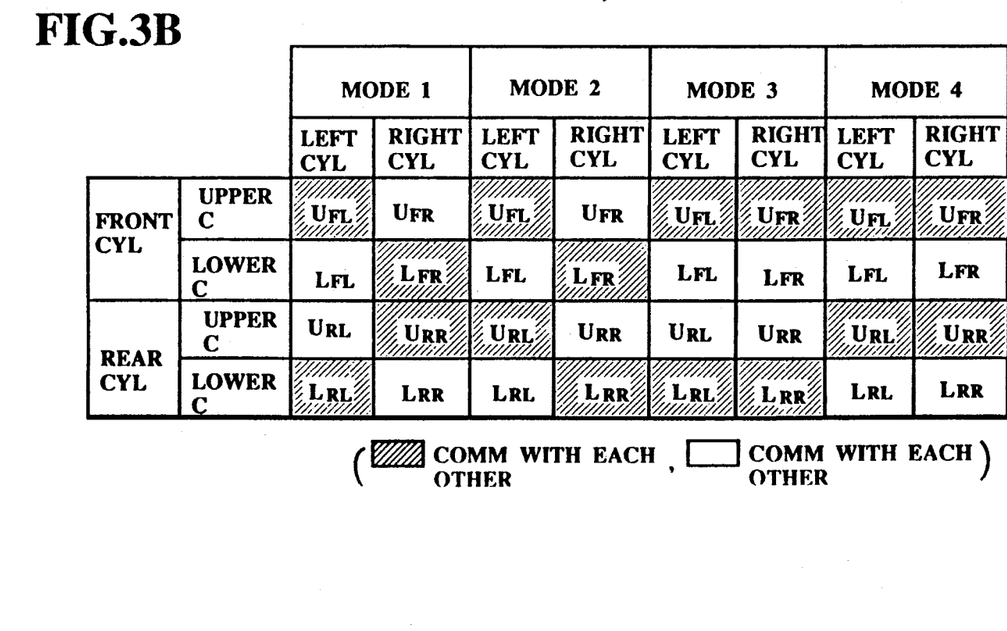
FIG. 3B is a table for assistance in explaining the relationship between the cylinder communication status and the control modes.

FIG. 3B shows various communication states of the upper and lower cylinder chambers U and L of the four hydraulic cylinders 20FL, 20FR, 20RL and 20RR for the four vehicle wheels in the respective four control modes. In the control mode 1, the upper and lower chambers U and L of the front left and right hydraulic cylinders 20FL and 20FR communicate with each other in cross state, and the upper and lower chambers U and L of the rear right and left hydraulic cylinders 20RR and 20RL communicate with each other also in cross state, so that the front side hydraulic cylinders 20FL and 20FR are connected to each other in cross (180° out-of-phase) state with respect to the rear side hydraulic cylinders 20RL and 20RR.

Here, U denotes the upper chamber; L denotes the lower chamber; 20FL denotes the front left hydraulic cylinder; 20FR denotes the front right hydraulic cylinder; 20RL denotes the rear left hydraulic cylinder; and 20RR denotes the rear right hydraulic cylinder.

In the control mode 2, U and L of 20FL and 20FR communicate with each other in cross connection, and further U and L of 20RL and 20RR communicate with each other in cross connection, so that 20FL and 20FR are connected to each other in parallel (in-phase) state with respect to 20RL and 20RR. In the control mode 3, U and U of 20FL and 20FR communicate with each other in parallel connection, and L and L of 20RL and 20RR communicate with each other also in parallel state, so that 20FL and 20FR are connected to each other in cross (180° out-of-phase) state with respect to 20RL and 20RR. In the control mode 4, U and U of 20FL and 20FR communicate with each other in parallel state and U and U of 20RL and 20RR communicate with each other in parallel state, so that 20FL and 20FR are connected to each other in parallel (in-phase) state with respect to 20RL and 20RR.

The control unit 14B comprises a controller 36 for controlling two damping coefficients C of the two adjustable throttle valves 24A and 24B and the switching positions of the three switch valves 22F, 22R and 22C; a lateral acceleration sensor 38 for outputting a signal Gy; a longitudinal acceleration sensor 39 for outputting a signal Gx, and a vertical acceleration sensor 40 for outputting a signal Gz. The controller 36 is provided with a microcomputer and solenoid driver circuits, and outputs various control signals $i_M$, $i_M$, $CS_F$, $CS_R$, $CS_C$ to solenoids of the two adjustable throttle valves 24A and 24B and the three switch valves 22F, 22R and 22C, in accordance with the control procedure shown in FIG. 4, in response to the sensor signals Gy, Gx and Gz of the acceleration sensors 38, 39 and 40. These acceleration sensors 38, 39 and 40 are attached to predetermined positions on the vehicle body and generate acceleration voltage signals Gy, Gx and Gz with a plus or minus sign, respectively, in correspondence with the lateral, longitudinal and vertical inertia forces generated at the vehicle body.

Figure 3C:
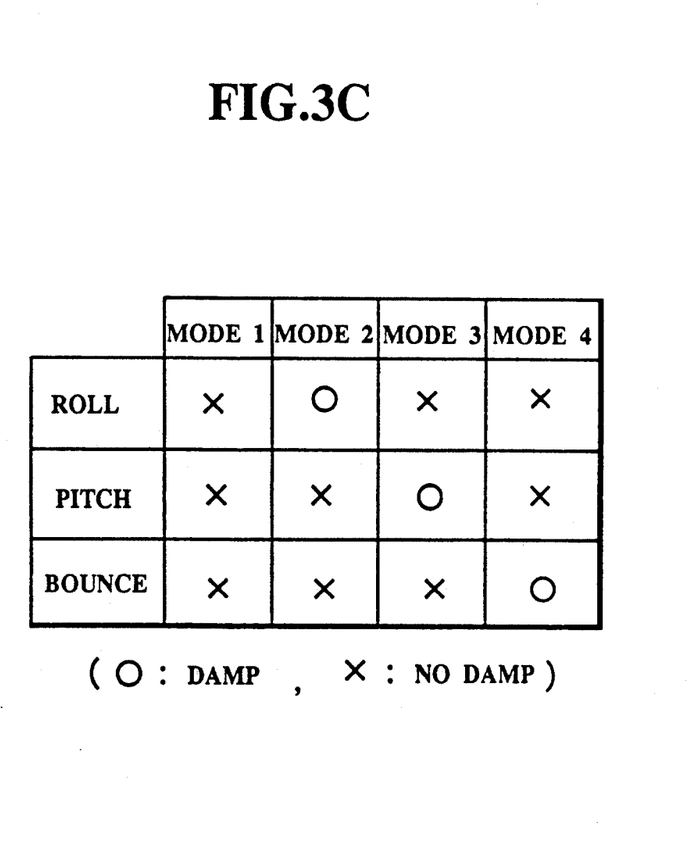
FIG. 3C is a table for assistance in explaining the relationship between the damping effects and the control modes.

The operation of the embodiment will be described hereinbelow with reference to FIG. 4. The controller 36 executes the procedure shown in FIG. 4 in accordance with timer interruption processing executed every predetermined time period. First, the controller reads a lateral acceleration signal Gy of the lateral acceleration sensor 38 and stores the read signal Gy (in step S1), and checks whether $|Gy| > Gy_o$, where $Gy_o$ denotes a threshold to determine whether vehicle rolling motion must be damped (in step S2). If NO, control proceeds to the succeeding step to command the control mode 1 (in step S3), so that the electromagnetic direction switch valves 22F, 22R and 22C are switched as shown in FIG. 3A. In this control mode 1, the controller 36 outputs three turn-on switch control signals $CS_F$, $CS_R$ and $CS_C$ to energize these three switch valves 22F, 22R an 22C into "cross connection", respectively, so that the two (i.e. upper and lower) hydraulic chambers U and L of the two (i.e. right and left) front hydraulic cylinders 20FL and 20FR are connected in cross (180° out-of-phase) state and further the two hydraulic chambers U and L of the two rear hydraulic cylinders 20RR and 20RL are also connected in cross (180° out-of-phase) state in such a way that the front wheel hydraulic cylinders 20FL and 20FR are connected to each other in cross (180° out-of-phase) state with respect to the rear wheel hydraulic cylinders 20RL and 20RR, as shown in FIG. 3B. In this first control mode 1, rolling motion is not damped as shown in FIG. 3C.

Then, the controller reads a longitudinal acceleration signal Gx of the longitudinal acceleration sensor 39 and stores the read signal Gx (in step S4), and checks whether $|GX| > Gx_o$, where $Gx_o$ denotes a threshold to determine whether pitching motion must be damped (in step S5). If NO, control proceeds to the succeeding step to command the control mode 1 (in step S6) in the same way as in step S3 above, so that pitching motion is not damped as shown in FIG. 3C.

Thereafter, the controller reads a vertical acceleration signal Gz of the vertical acceleration sensor 40 and stores the read signal Gz (in step S7), and checks whether $|Gz| > Gz_o$, where $Gz_o$ denotes a threshold to determine whether bouncing motion must be damped (in step S8). If NO, control proceeds to the succeeding step to command the control mode 1 (in step S9) in the same way as in steps S3 and S6 above, so that bouncing motion is not damped as shown in FIG. 3C. That is, if NO in steps S2, S5 and S8, then these controller maintains the control mode 1 without damping the vehicle motion and returns to the main program (not shown).

However, if YES in step S2 as when the vehicle turns sharply, control commands the controller mode 2 (in step S10), so that the electromagnetic direction switch valves 22F, 22R and 22C are switched as shown in FIG. 3A. In this control mode 2, the controller 36 outputs two turn-on switch control signals $CS_F$ and $CS_R$ to energize these two switch valves 22F and 22R into "cross connection", respectively, and a turn-off switch control signal $CS_c$ to deenergize the switch valve 22C into "parallel connection", so that the two hydraulic chambers of the two front wheel hydraulic cylinders are connected in cross state and further the two hydraulic chambers of the two rear wheel hydraulic cylinders are also connected in cross state in such a way that the front wheel hydraulic cylinders are connected to each other in parallel (in-phase) state with respect to the rear wheel hydraulic cylinders, as shown in FIG. 3B. In this second control mode 2, only rolling motion is damped as shown in FIG. 3C. That is, the controller determines on the basis of the detected acceleration Gy a throttle diameter command M applied to both the adjustable throttle valves 24A and 24B with reference to a memory map previously stored in a microcomputer in the controller 36 and shown in FIG. 5 (in step S11). In FIG. 5, the command value M decreases with increasing acceleration $|GY|$, $|Gx|$ and $|Gz|$. The determined command M is outputted (in step S12), so that the controller 36 supplies two command currents $i_M$ proportional to the command M to the two adjustable throttle valves 24A and 24B to set the throttle diameters of the two throttle valves 24A and 24B to values corresponding to the command M determined in step S11.

Further, if YES in step S5 as when the vehicle is braked suddenly, the controller commands the control mode 3 (in step S13), so that the electromagnetic direction switch valves 22F, 22R and 22C are switched as shown in FIG. 3A. In this control mode 3, the controller 36 outputs two turn-off switch control signals $CS_F$ and $CS_R$ to deenergize these two switch valves 22F and 22R into "parallel connection" and a turn-on switch control signal $CS_c$ to energize the switch valve 22C into "cross connection" so that the two hydraulic chambers of the two front wheel hydraulic cylinders are connected in parallel state and further the two hydraulic chambers of the two rear wheel hydraulic cylinders are also connected in parallel state in such a way that the front wheel hydraulic cylinders are connected to each other in cross (180° out-of-phase) state with respect to the rear wheel hydraulic cylinders, as shown in FIG. 3B. In this third control mode 3, only pitching motion is damped as shown in FIG. 3C. That is, the controller determines on the basis of the detected acceleration Gx a throttle diameter command M supplied to both the adjustable throttle valves 24A and 24B with reference to the memory map shown in FIG. 5 (in step S14). The determined command M is outputted (in step S15), so that the controller 36 supplies two command currents $i_M$ proportional to the command M to the two adjustable throttle valves 24A and 24B to set the throttle diameters of the two throttle valves 24A and 24B to values corresponding to the command M determined in step S14.

Further, if YES in step S8 as when the vehicle is bounced violently during travelling on a rough road, the controller commands the control mode 4 (in step S16), so that the electromagnetic direction switch valves 22F, 22R and 22C are switched as shown in FIG. 3A. In the control mode 4, the controller 36 outputs three turn-off switch control signals $CS_F$, $CS_R$ and $CS_C$ to deenergize these three switch valves 22F, 22R and 22C into "parallel connection", so that the two hydraulic chambers of the two front wheel hydraulic cylinders are connected in parallel state and further the two hydraulic chambers of the two rear wheel hydraulic cylinders are also connected in parallel state in such a way that the front wheel hydraulic cylinders are connected to each other in parallel (in-phase) state with respect to the rear wheel hydraulic cylinders, as shown in FIG. 3B. In this fourth control mode 4, only bouncing motion is damped as shown in FIG. 3C. That is, the controller determines on the basis of the detected acceleration Gz a throttle diameter command M applied to both the adjustable throttle valves 24A and 24B with reference to the memory map shown in FIG. 5 (in step S17). The determined command M is outputted (in step S18), so that the controller 36 supplies two command currents $i_M$ proportional to the command M to the two adjustable throttle valves 24A and 24B to set the throttle diameters of the two throttle valves 24A and 24B to values corresponding to the command M determined in step S16.

In the above procedure, the steps S1, S4 and S7 correspond to the functions of the three acceleration sensors 38, 39 and 40 shown in FIG. 2 or the behavior detecting means A shown in FIGS. 1A and 1B; the steps S2, S5 and S8 correspond to the functions of the behavior discriminating means B shown in FIGS. 1A and 1B; the steps S3, S10, S6, S13, S9 and S16 correspond to the functions of the switch valve control means C shown in FIGS. 1A and 1B; and the steps S11, S12, S14, S15, S17 and S18 correspond to the functions of the damping force adjusting means D shown in FIG. 1B, respectively.

The entire operation of the embodiment will be described hereinbelow.

Figure 4:
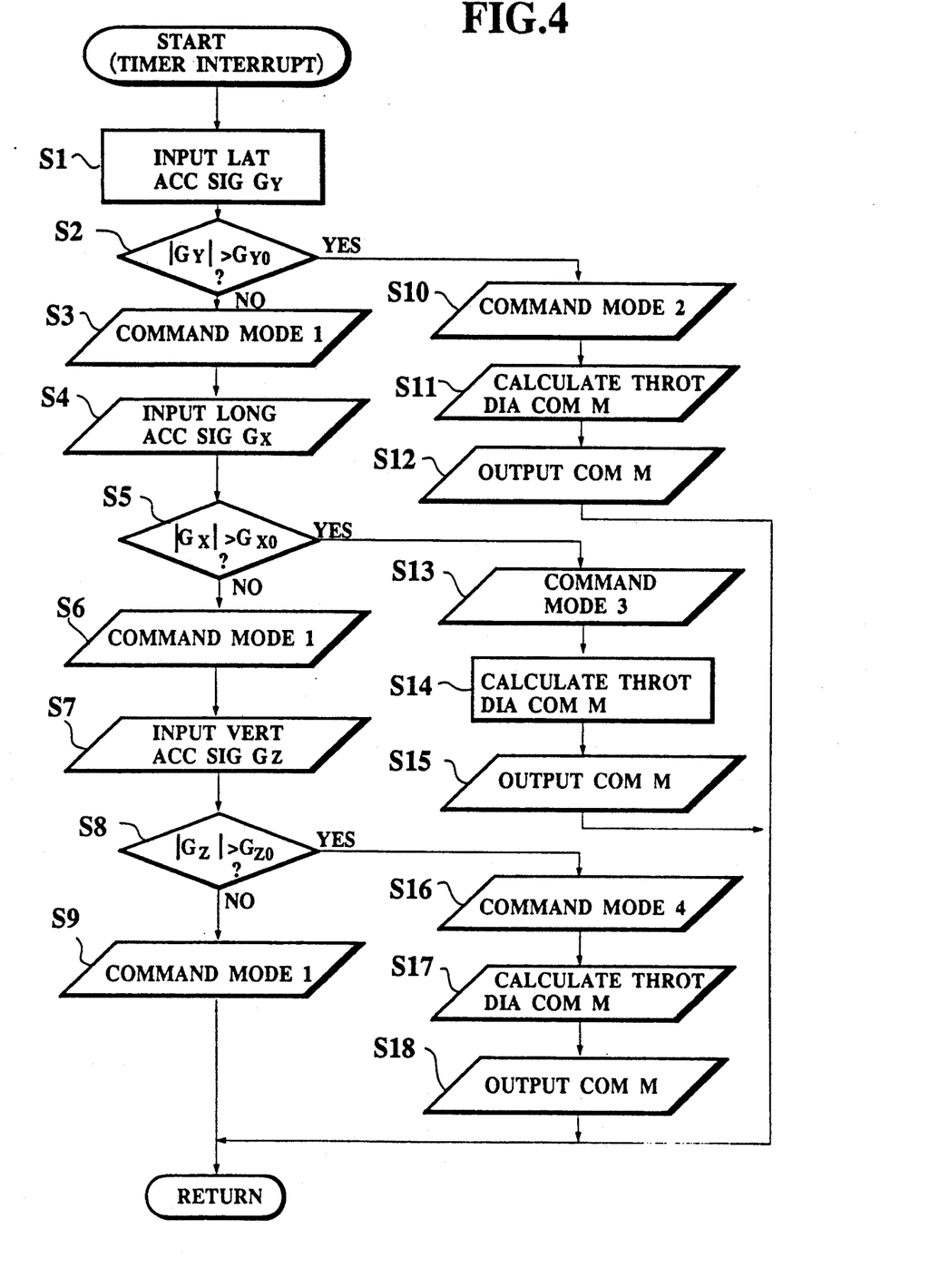
FIG. 4 is a flowchart for assistance in explaining the procedure executed by the controller.

When the vehicle is travelling straight on a paved road, since the lateral, longitudinal and vertical acceleration sensors 38, 39 and 40 generate sensor signals Gy, Gx and Gz of roughly zero, the controller determines NO in steps S2, S5 and S8 shown in FIG. 4. Therefore, the control mode of the damping force control apparatus 14 of the embodiment is set to the first control mode 1, so that the communication relationship between the upper and lower chambers is 180° out-of-phase with respect to each other between the left and right hydraulic cylinders and between the front and rear hydraulic cylinders as shown in FIG. 3B. In addition, the throttle diameters of the two adjustable throttle valves 24A and 24B are set roughly full open. Further, under these straight travelling conditions, since no large change in distance between the wheels and the vehicle body occurs, the operating fluid does not pass though the adjustable throttle valves 24A and 24B, so that no damping force is generated. Further, since the damping force of each shock absorber is almost zero, excellent riding comfort can be maintained by the four coil springs 12.

During the straight travelling condition, even if the vehicle is turned gently or accelerated a little, since the detected sensor signals are less than the respective thresholds as $|Gy| \leq Gy_o$, $|Gx| \leq Gx_o$ and $|Gz| \leq Gz_o$, the control mode 1 is maintained.

When the vehicle is rolled a little and therefore the strokes of the left wheel side hydraulic cylinders 20FL and 20RL are decreased and the strokes of the right wheel side hydraulic cylinders 20FR and 20RR are increased, the upper cylinder chambers U of the left wheel side hydraulic cylinder 20FL and 20RL and the lower cylinder chambers L of the right wheel side hydraulic cylinders 20FR and 20RR are compressed and the other cylinder chambers U and L are extended. Here, the upper and lower cylinder chambers U and L of the cylinders 20FL, 20FR, 20RL and 20RR are denoted as $U_{FL}$, $L_{FL}$; $U_{FR}$, $L_{FR}$; $U_{RL}$, $L_{RL}$; and $U_{RR}$, $L_{RR}$, respectively, as shown in FIG. 3B. Under these conditions, operating fluid fed from the compressed upper cylinder chamber $U_{FL}$ and lower cylinder chamber $L_{FR}$ flows into the extended lower cylinder chamber $L_{RL}$ and upper cylinder chamber $U_{RR}$, and further operating fluid fed from the compressed upper cylinder chamber $U_{RL}$ and lower cylinder chamber $L_{RR}$ flows into the extended lower cylinder chamber $L_{FL}$ and upper cylinder chamber $U_{FR}$. In addition, since each hydraulic cylinder 20FL to 20RR is of double acting rod type, the volume change rate due to compression is the same as that due to extension, so that the operating fluid in the compressed side hydraulic circuit is introduced as it is to the extended side hydraulic circuit without passing through the two adjustable throttle valves 24A and 24B. That is, since no damping force is generated by the adjustable throttle valves 24A and 24B, the rolling motion is damped only by each shock absorber 10 for each wheel generated according to the rolling acceleration. The damping force under these conditions is represented by a vector v1, shown in FIG. 7, which damps a small rolling motion gently, without transmitting vibration from the to the vehicle to maintain excellent riding comfort.

Figure 7:
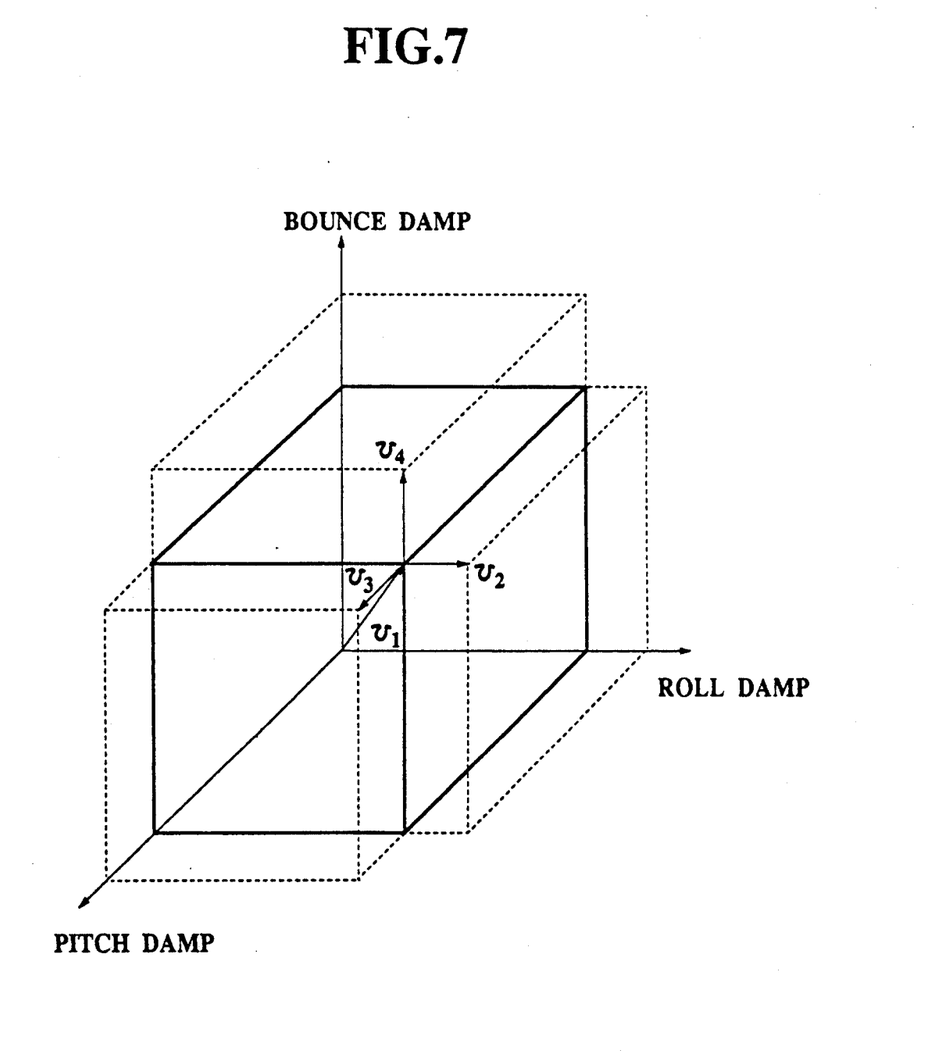
FIG. 7 is a three-dimensional graphical representation showing the respective damping force vectors V2 to V4 against rolling, pitching and bouncing motions added to the initial damping force vector V1 generated by each shock absorber.

When the vehicle is pitched a little and therefore the strokes of the front wheel side hydraulic cylinder 20FL and 20FR are decreased and the strokes of the rear wheel side hydraulic cylinders 20RL and 20RR are increased, the front side upper cylinder chambers $U_{FL}$ and $U_{FR}$ and the rear side lower cylinder chambers $L_{RL}$ and $L_{RR}$ are compressed and the front side lower cylinder chambers $L_{FL}$ and $L_{FR}$ and the rear side upper cylinder chambers $U_{RL}$ and $U_{RR}$ are extended. Under these conditions, the operating fluid fed from the cylinder chamber $U_{FL}$ flows mainly to the cylinder chamber $L_{FR}$; the operating fluid fed from the cylinder chamber $U_{FR}$ flows mainly into the cylinder chamber $L_{FL}$; the operating fluid fed from the cylinder chamber $L_{RL}$ flows into the cylinder chamber $U_{RR}$; and the operating fluid fed from the cylinder chamber $L_{RR}$ flows into the cylinder chamber $U_{RL}$, so that the quantity of hydraulic fluid passing through the adjustable throttle values 24A and 24B will not change that is, no damping force is generated by the damping force control apparatus 14. Therefore, a damping force represented by a vector $v_1$ shown in FIG. 7 is maintained, and the pitching motion is appropriately damped by the damping force of the shock absorbers 10, without transmitting vibration from the road to the vehicle to maintain an excellent riding comfort.

When the vehicle is bounced a little and therefore the strokes of the four hydraulic cylinders 20 are all decreased, the four upper cylinder chambers $U_{FL}$ to $U_{RR}$ are compressed and the four lower cylinder chambers thereof are extended. Under these conditions, the operating fluid fed from the cylinder chamber $U_{FL}$ flows mainly into the cylinder chamber $L_{FR}$; that fed from the cylinder chamber $U_{FR}$ flows mainly into the cylinder chamber $L_{FL}$; that fed from the cylinder chamber $U_{RL}$ flows into the cylinder chamber $L_{RR}$; that fed from the cylinder chamber $U_{RR}$ flows mainly into the cylinder chamber $L_{RL}$, respectively. Therefore, the quantity of hydraulic fluid flowing through the adjustable throttle valves 24A and 24B will not change; that is, no damping force is generated by the damping force control unit 14. Therefore, a damping force represented by a vector $v_1$ shown in FIG. 7 is maintained, and the bouncing motion is appropriately damped by the damping force of the shock absorber 10 to maintain excellent riding comfort.

As described above, if $|Gy| \leq Gy_o$, $|Gx| \leq Gx_o$, and $|Gz| \leq Gz_o$ and therefore the control mode 1 is set, the damping force control apparatus 14 generates no damping force against each of vehicle rolling, pitching and bouncing motions as shown in FIG. 3C. In other words, the vehicle is damped by only the relatively low damping forces of the shock absorbers 10 provided for the respective wheels to maintain an excellent riding comfort.

On the other hand, when the vehicle is turned quickly and therefore $|Gy| \leq Gy_o$ is established, the controller determines YES in step S2 in FIG. 4 and sets the control mode 2. Therefore, as shown in FIG. 3B, the cylinder chamber $U_{FL}$ communicates with the cylinder chamber $L_{FR}$ and the cylinder chamber $U_{RL}$ communicates with the cylinder chamber $L_{RR}$ to construct one hydraulic circuit. Further, the cylinder chamber $L_{FL}$ communicates with the cylinder chamber $U_{FR}$ and the cylinder chamber $L_{RL}$ communicates with the cylinder chamber $U_{RR}$ to construct the other hydraulic circuit. At the same time, the throttle diameters of the two adjustable throttle valves 24A and 24B are ajusted to values proportional to the detected lateral acceleration $|Gy|$. For instance, when the vehicle is rolled in such a way that the left wheel side falls downward and the right wheel side rises upward, the cylinder chambers $U_{FL}$, $L_{FR}$, $U_{RL}$ and $L_{RR}$ are all compressed and the cylinder chambers $L_{FL}$, $U_{FR}$, $L_{RL}$ and $U_{RR}$ are all extended. Therefore, the operating fluid of one hydraulic circuit flows into one accumulator 25A via the adjustable throttle valve 24A; in contrast, the operating fluid of the other accumulator 25B flows into the other hydraulic circuit via the adjustable throttle valve 24B. In this case, since a damping force can be generated according to change in the quantity of hydraulic fluid passing through the adjustable throttle valves 24A and 24B, it is possible to damp the rolling motion.

In this control mode 2, even if pitching motion occurs, since the operating fluid fed from the compressed cylinder chambers flows to the diagonally arranged cylinder chambers connected in cross state between the front and rear wheels (e.g. $U_{FL} \rightarrow L_{FR}$; $U_{FR} \rightarrow L_{FL}$; $L_{RL} \rightarrow U_{RR}$; and $L_{RR} \rightarrow U_{RL}$) as already described, the quantity of hydraulic fluid passing through the two adjustable throttle valves 24A and 24B will not change. Further, even if bouncing motion occurs, since the change in quantity of hydraulic fluid is absorbed between the two diagonally arranged cylinder chambers in the same way, the quantity of hydraulic fluid passing through the two adjustable throttle valves 24A and 24B will not change.

As described above, in the control mode 2, only the rolling motion is damped as shown in FIG. 3C by, and as shown a vector $V_2$ in FIG. 7. This rolling motion damping vector $v_2$ has only a component in the roll damping direction added to the vector $v_1$ of the shock absorber 10, in such a way that the vector $v_2$ is adjusted according to the magnitude of the lateral acceleration Gy. Therefore if the lateral acceleration Gy increases at quick turning, "roll damping effect/pitch damping effect" and "roll damping effect/bounce damping effect" are both adjusted largely as the whole suspension. That is, since rolling motion due to quick turning can be suppressed securely and the damping force against bouncing is kept relatively low as in the control mode 1, it is possible to obtain excellent riding comfort without transmitting vibration from the road to the vehicle.

On the other hand, when the vehicle is accerlerated suddenly and therefore $|Gx| \leq Gx_o$ is established, the controller determines YES in step S5 in FIG. 4 and sets the control mode 3. Therefore, as shown in FIG. 3B, the cylinder chamber $U_{FL}$ communicates with the cylinder chamber $U_{FR}$ and the cylinder chamber $L_{RL}$ communicates with the cylinder chamber $L_{RR}$ to construct one hydraulic circuit. Further, the cylinder chamber $L_{FL}$ communicates with the cylinder chamber $L_{FR}$ and the cylinder chamber $U_{RL}$ communicates with the cylinder chamber $U_{RR}$ to construct the other hydraulic circuit. At the same time, the throttle diameters of the two adjustable throttle valves 24A and 24B are adjusted to values proportional to the detected longitudinal acceleration $|Gx|$. For instance, when the vehicle is pitched in such a way that the front wheel side falls downward and the rear wheel side rises upward, the cylinder chambers $U_{FL}$, $U_{FR}$, $L_{RL}$, and $L_{RR}$ are all compressed and the cylinder chambers $L_{FL}$, $L_{FR}$, $U_{RL}$ and $U_{RR}$ are all extended. Therefore, the operating fluid of one hydraulic circuit flows into one accumulator 25A via the adjustable throttle valve 24A; in contrast, the operating fluid of the other accumulator 25B flows into the other hydraulic circuit via the adjustable throttle valve 24B. In this case, since a damping force can be generated according to change in the quantity of hydraulic fluid passing through the adjustable throttle valves 24A and 24B, it is possible to damp the pitching motion.

In this control mode 3, even if rolling motion occurs, since the operating fluid fed from the compressed cylinder chambers flows to the right and left cylinder chambers connected in parallel state between the front and rear wheels (e.g. $U_{FL} \rightarrow U_{RL}$; $L_{RL} \rightarrow L_{FL}$; $U_{RL} \rightarrow U_{RR}$; and $L_{RR} \rightarrow L_{RL}$), the quantity of hydraulic fluid passing through the two adjustable throttle valves 24A and 24B will not change. Further, even if bouncing motion occurs, since the operating fluid fed from the compressed cylinder chambers flows into the extended side cylinder chambers between the front and rear wheels (e.g. $U_{FL} \rightarrow L_{RL}$, $L_{RR}$; $U_{FR} \rightarrow L_{RL}$, $L_{RR}$; $U_{RL} \rightarrow L_{FR}$; and $U_{RR} \rightarrow L_{FL}$, $L_{FR}$), the quantity of hydraulic fluid passing through the two adjustable throttle valves 24A and 24B will not change.

As described above, in the control mode 3, only the pitching motion is damped as shown in FIG. 3C, and as shown by a vector $v_3$ in FIG. 7. This pitching motion damping vector $v_3$ has only a component in the pitch damping direction added to the vector $v_1$ of the shock absorber 10, in such a way that the vector $v_3$ is adjusted according to the magnitude of the lateral acceleration Gx. Therefore, if the longitudinal acceleration Gx increases at sudden acceleration, "pitch damping effect/roll damping effect" and "pitch damping effect/bounce damping effect" are both adjusted largely as the whole suspension. That is, since pitching due to sudden acceleration can be suppressed securely and the damping force against bouncing is kept relatively low as in the control mode 1, it is possible to obtain excellent riding comfort without transmitting vibration from the road to the vehicle.

On the other hand, when the vehicle is travelling on a rough road and therefore $|Gz| > Gz_o$ is established, the controller determines YES in step S8 in FIG. 4 and sets the control mode 4. Therefore, as shown in FIG. 3B, the cylinder chamber $U_{FL}$ communicates with the cylinder chamber $U_{FR}$ and the cylinder chamber $U_{RL}$ communicates with the cylinder chamber $U_{RR}$ to construct one hydraulic circuit. Further, the cylinder chamber $L_{FL}$ communicates with the cylinder chamber $L_{FR}$ and the cylinder chamber $L_{RL}$ communicates with the cylinder chamber $L_{RR}$ to construct the other hydraulic circuit. At the same time, the throttle diameters of the two adjustable throttle valves 24A and 24B are adjusted to values proportional to the detected vertical acceleration $|Gy|$. For instance, when the vehicle is bounced in such a way that the vehicle body falls downward, the cylinder chambers $U_{FL}$, $U_{FR}$, $U_{RL}$ and $U_{RR}$ are all compressed and the cylinder chambers $L_{FL}$, $L_{FR}$, $L_{RL}$, and $L_{RR}$ are all extended. Therefore, the operating fluid of one hydraulic circuit flows into one accumulator 25A via the adjustable throttle valve 24A, in constrast, the operating fluid of the other accumulator 25B flows into the other hydraulic circuit via the adjustable throttle valve 24B. In this case, since a damping force can be generated according to change in the quantity of hydraulic fluid passing through the adjustable throttle valves 24A and 24B, it is possible to damp the bouncing motion.

In this control mode 4, even if rolling motion occurs, since the operating fluid fed from the compressed cylinder chambers flows to the right and left cylinder chambers connected in parallel state between the front and rear wheels (e.g. $U_{FL} \rightarrow U_{FR}$; $L_{FR} \rightarrow L_{FL}$; $U_{RL} \rightarrow U_{RR}$; and $L_{RR} \rightarrow L_{RL}$), the quantity of hydraulic fluid passing through the two adjustable throttle valves 24A and 24B will not change. Further, even if pitching motion occurs, since the operating fluid fed from the compressed cylinder chambers flows into the extended side cylinder chambers between the front and rear wheels (e.g. $U_{FL} \rightarrow U_{RL}$, $U_{RR}$; $U_{FR} \rightarrow U_{RL}$, $U_{RR}$; $L_{RL} \rightarrow L_{FL}$, $L_{FR}$; $L_{RR} \rightarrow L_{FL}$, $L_{FR}$), the quantity of hydraulic fluid passing through the two adjustable throttle valves 24A and 24B will not change.

As described above, in the control mode 4, only the bouncing motion is damped as shown in FIG. 3c, and as shown by a vector $v_4$ in FIG. 7. This bouncing motion damping vector $v_4$ has only a component in the roll damping direction added to the vector $v_1$ of the shock absorber 10, in such a way that the vector $v_4$ is adjusted according to the magnitude of the vertical acceleration Gz. Therefore, if the vertical acceleration Gz increases at high speed travel on a rough road "bounce damping effect/roll damping effect" and "bounce damping effect/pitch damping effect" are both adjusted largely as the whole suspension. Therefore, bouncing due to high speed travel on a rough road can be suppressed securely.

As described above, in the damping force control system according to the present invention, a damping force control apparatus 14 including four shock absorbers 10 and four hydraulic cylinders 20 is provided for the vehicle suspension, so that any one of rolling, pitching and bouncing motions can be selectively damped. Therefore, the vehicle vibration can be securely suppressed, without increasing the bouncing damping effect when the rolling and pitching motions are damped, thus improving riding comfort. In addition, in the present invention, since vehicle vibration behavior is detected in the order of rolling, pitching and bouncing, it is possible to effectively actuate the damping force control apparatus 14 to prevent passengers' discomfort.

Further, in the above-mentioned embodiment, four control modes are set in the priority order of rolling, pitching and bouncing. Without being limited thereto, it is also possible to provide only two modes including the control mode 1 (no damping) and the control mode 2 (roll damping) for the control unit 14. In this case, only the intermediate switch valve 22c and the lateral acceleration sensor 38 are required.

Further, only three modes including the control mode 1, and any two of the control mode 2, the control mode 3 (pitch damping) and the control mode 4 (bounce damping) can be provided for the control apparatus 14 to simplify the control procedure. Further, the priority order of rolling, pitching and bouncing motions can be modified freely according to the type of vehicles. Further, in the above-mentioned embodiments, the damping coefficient of the shock absorbers 10 of the suspension system to which the damping force control apparatus 14 is applied is fixed. Without being limited thereto, it is of course possible to adopt shock absorbers whose damping coefficient is adjustable according to vehicle vibration behavior.

Further, the vehicle vibration detecting means is not limited to only means for detecting vehicle accelerations themselves, but may also be means for detecting change rates in lateral, longitudinal and vertical acceleration. In this case, the behavior discriminating means discriminates whether a damping control is required by comparing the detected acceleration change rate with a reference change rate, respectively. On the other hand, when the behavior detecting means is a rolling motion sensor, a steering wheel angle sensor or a steering wheel angular rate sensor can be used. In this case, it is preferable to detect the rolling motion in combination with vehicle speed. Further, when the behavior detecting means is a pitching motion sensor, a brake switch signal or change in engine speed can be detected.

Further, in the above-mentioned embodiment, the damping force generating mechanisms (i.e., the adjustable throttle valves 24A and 24B) are adopted so that the damping force can be adjusted according to the magnitude of rolling, pitching and bouncing motions. However, throttle valves provided with fixed damping coefficients can be adopted.

Further, in the above embodiment, the upper and lower cylinder chambers of the front and rear wheel side hydraulic cylinders are connected by two parallel arranged hydraulic pipes 26A and 26B and these hydraulic pipes 26A and 26B are selectively connected into cross or parallel states via the two switch valves 22F and 22R. However, it is of course possible to connect the upper and lower cylinder chambers of the front and rear wheel side hydraulic cylinders by two cross arranged hydraulic pipes 26A and 26B selectively connected into the opposite state via the two switch valves 22F and 22R.

Further, the operating fluid is not limited to only a liquid (oil), but a non-compressive gas can also be used as the operating fluid.

What is claimed is:

1. A vehicle vibration damping force control system, comprising:
   (a) a plurality of double-acting cylinders each formed with two chambers and provided between a vehicle body and a vehicle wheel, respectively;
   (b) a pipe arrangement for mutually connecting the two chambers of said plurality of double-acting cylinders, respectively, to feed operating fluid to said cylinders;
   (c) at least one damping force generating mechanism communicating with said pipe arrangement, for generating a damping force when the operating fluid is passed therethrough;
   (d) at least one switch valve disposed midway of said pipe arrangement, for switching operating fluid flow passage through said pipe arrangement;
   (e) behavior detecting means for detecting vehicle behavior and generating a behavior signal corresponding to the detected behavior;
   (f) behavior discriminating means for discriminating whether the detected behavior exceeds a predetermined level on the basis of the detected behavior signal; and
   (g) switch valve control means for controlling said switch valve so that the operating fluid energized by said plurality of double-acting cylinders due to the detected vehicle behavior may pass through said damping force generating mechanism, when said behavior discriminating means discriminates that the detected vehicle behavior exceeds the predetermined level.

2. The vehicle vibration damping force control system of claim 1, which further comprises: damping force adjusting means for adjusting said damping force of said damping force generating mechanism according to the detected behavior signal, when said behavior discriminating means discriminates that the detected vehicle behavior exceeds the predetermined level.

3. The vehicle vibration damping force control system of claim 1, wherein said behavior detecting means detects at least one of vehicle rolling motion, pitching motion and bouncing motion.

4. The vehicle vibration damping force control system of claim 3, wherein said behavior detecting means detects at least two of the three vehicle motions in a predetermined priority order.

5. The vehicle vibration damping force control system of claim 1, wherein said behavior detecting means comprising a lateral acceleration sensor for detecting vehicle rolling motion; a longitudinal acceleration sensor for detecting vehicle pitching motion; and a vertical acceleration sensor for detecting vehicle bouncing motion.

6. A method of controlling vehicle vibration, comprising the steps of:
   (a) detecting a first vehicle vibration behavior;
   (b) checking whether the detected first vibration behavior exceeds a first predetermined level;
   (c) if the detected first vibration behavior is equal to or less than the first predetermined level, detecting a second vehicle vibration behavior without increasing a vehicle vibration damping force;
   (d) checking whether the detected second vibration behavior exceeds a second predetermined level;
   (e) if the detected second vibration behavior is equal to or less than the second predetermined level, detecting a third vehicle vibration behavior without increasing said vehicle vibration damping force;
   (f) checking whether the detected third vibration behavior exceeds a third predetermined level;
   (g) if the detected third vibration behavior is equal to or less than the third predetermined level, then not increasing said vehicle vibration damping force;
   (h) if the detected first vibration behavior is more than the first predetermined level, in step (b) above, increasing said vehicle vibration damping force against only the detected first vibration behavior without increasing said vehicle vibration damping force against said second and third vibration behaviors;
   (i) if the detected second vibration behavior is more than the second predetermined level in step (d) above, increasing said vehicle vibration damping force against only the detected second vibration behavior without increasing said vehicle vibration damping force against said first and third vibration behaviors; and
   (j) if the detected third vibration behavior is more than the third predetermined level in step (f) above, increasing said vehicle vibration damping force against only the detected third vibration behavior without increasing said vehicle vibration damping force against said first and second vibration behaviors.

7. The method of controlling vehicle vibration of claim 6, which further comprises the steps of:
   (a) adjusting the vehicle vibration damping force against the first vibration behavior on the basis of the detected first vibration behavior;
   (b) adjusting the vehicle vibration damping force against the second vibration behavior on the basis of the detected second vibration behavior; and (c) adjusting the vehicle vibration damping force against the third vibration behavior on the basis of the detected third vibration behavior.

8. The method of controlling vehicle vibration of claim 6, wherein the first vibration behavior is vehicle rolling motion; the second vibration behavior is vehicle pitching motion; and the third vibration behavior is vehicle bouncing motion.

* * * * *